US010842717B2

(12) United States Patent
Gosselin et al.

(10) Patent No.: US 10,842,717 B2
(45) Date of Patent: Nov. 24, 2020

(54) CONTAINER WITH A DISPENSING SCHEDULE

(71) Applicant: RedCap, LLC, Marblehead, MA (US)

(72) Inventors: Daniel Albert Gosselin, Gloucester, MA (US); Alfred Richard Balakier, Kirkland, WA (US)

(73) Assignee: Redcap, LLC, Marblehead, MA (US)

( * ) Notice: Subject to any disclaimer, the term of this patent is extended or adjusted under 35 U.S.C. 154(b) by 439 days.

(21) Appl. No.: 15/470,680

(22) Filed: Mar. 27, 2017

(65) Prior Publication Data

US 2017/0202748 A1  Jul. 20, 2017

Related U.S. Application Data

(63) Continuation-in-part of application No. 15/331,875, filed on Oct. 23, 2016, now Pat. No. 9,729,277, which is a continuation of application No. 14/275,661, filed on May 12, 2014, now Pat. No. 9,492,356.

(60) Provisional application No. 61/822,214, filed on May 10, 2013.

(51) Int. Cl.
*A61J 7/04* (2006.01)
*B65D 41/04* (2006.01)
(Continued)

(52) U.S. Cl.
CPC ........... *A61J 7/0436* (2015.05); *A61J 7/0481* (2013.01); *B65D 41/0471* (2013.01);
(Continued)

(58) Field of Classification Search
CPC . A61J 7/04; A61J 2200/70; B65D 2583/0409; B65D 51/245; B65D 41/0435;
(Continued)

(56) References Cited

U.S. PATENT DOCUMENTS 4,011,829 A * 3/1977 Wachsmann ............... A61J 7/04
116/308
4,365,722 A * 12/1982 Kramer .................... A61J 7/04
116/308
(Continued)

OTHER PUBLICATIONS

See Interoperates Definition, Merriam-Webster.com, http://www.merriam-webster.com/dictionary/interoperates (last visited on Mar. 31, 2020); see also, Operate Definition, Merriam-Webster.com, http://www.merriam-webster.com/dictionary/interoperates (last visited on Mar. 31, 2020).*

*Primary Examiner* — Kareen K Thomas
(74) *Attorney, Agent, or Firm* — Olympic Patent Works PLLC

(57) ABSTRACT

The current disclosure is directed to a container with a dispensing schedule and, in various described implementations, to a container and a complementary cap that includes a dispensing schedule. During each dispensing cycle, which includes removing the cap from the container to allow access to the contents of the container and re-securing the cap to the container, the display schedule is automatically advanced to a next indication. In one implementation, the container is a bottle with a threaded neck and the cap is complementarily threaded and has a cylindrical rim and a schedule display. An indication on or within the schedule display is displayed through an aperture in the cap rim. Features included in the cap and the schedule display interoperate to ensure that the displayed indication is advanced to a next indication when the cap is unscrewed from, and subsequently threaded onto, the bottle.

14 Claims, 11 Drawing Sheets

(51) Int. Cl.
*H04L 5/00* (2006.01)
*H04B 17/336* (2015.01)
*H04B 7/04* (2017.01)
*H04L 1/02* (2006.01)
*H04B 7/0413* (2017.01)

(52) U.S. Cl.
CPC ........... B65D 41/0478 (2013.01); H04B 7/04 (2013.01); H04B 17/336 (2015.01); H04L 1/02 (2013.01); H04L 5/006 (2013.01); H04B 7/0413 (2013.01)

(58) Field of Classification Search
CPC ...... B65D 1/0246; G06M 1/24; G06M 1/248; G09F 11/23
USPC ................... 116/308–315; 206/45; 215/230; 220/212
See application file for complete search history.

(56) References Cited

U.S. PATENT DOCUMENTS

| | | | | |
|---|---|---|---|---|
| 4,782,966 A * | 11/1988 | Thackrey | ............. | B65D 50/043 116/308 |
| 5,082,130 A * | 1/1992 | Weinstein | ............ | B65D 50/045 215/203 |
| 5,261,548 A * | 11/1993 | Barker | ...................... | A61J 7/02 206/534 |
| RE34,930 E * | 5/1995 | Kusz | ......................... | A61J 7/04 116/308 |
| 5,638,970 A * | 6/1997 | Garby | ...................... | A61J 7/04 116/308 |
| 5,678,712 A * | 10/1997 | Rios | ..................... | B65D 50/041 116/308 |
| 6,789,497 B1 * | 9/2004 | Aiken | ..................... | G09F 11/23 116/308 |
| 7,004,164 B2 * | 2/2006 | Scarrott | ............. | A61M 15/009 116/307 |
| 7,314,022 B2 * | 1/2008 | Sollaccio | ................ | G09F 11/23 116/308 |
| 7,621,273 B2 * | 11/2009 | Morton | ............. | A61M 15/0065 128/200.14 |
| 7,661,384 B2 * | 2/2010 | Mataya | ..................... | A61J 7/04 116/307 |
| 7,878,350 B2 * | 2/2011 | Ramoundos | ............ | G09F 11/04 116/308 |
| 8,763,553 B1 * | 7/2014 | Shannehan | ............... | A61J 7/04 116/308 |
| 8,887,656 B2 * | 11/2014 | Killinger | ............. | A61M 1/0001 116/306 |
| 2015/0122688 A1 * | 5/2015 | Dias | ..................... | A47G 19/025 206/459.1 |

* cited by examiner

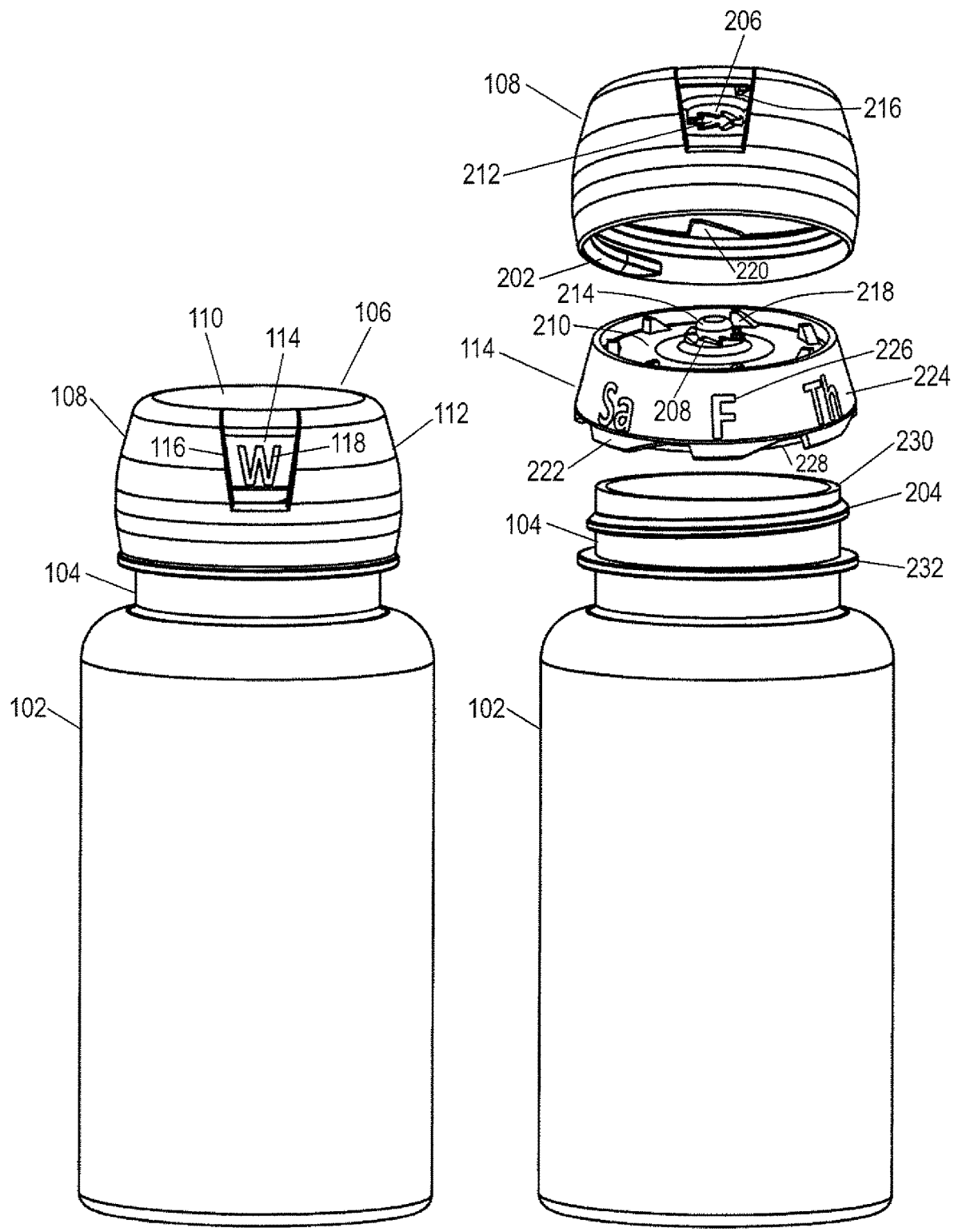

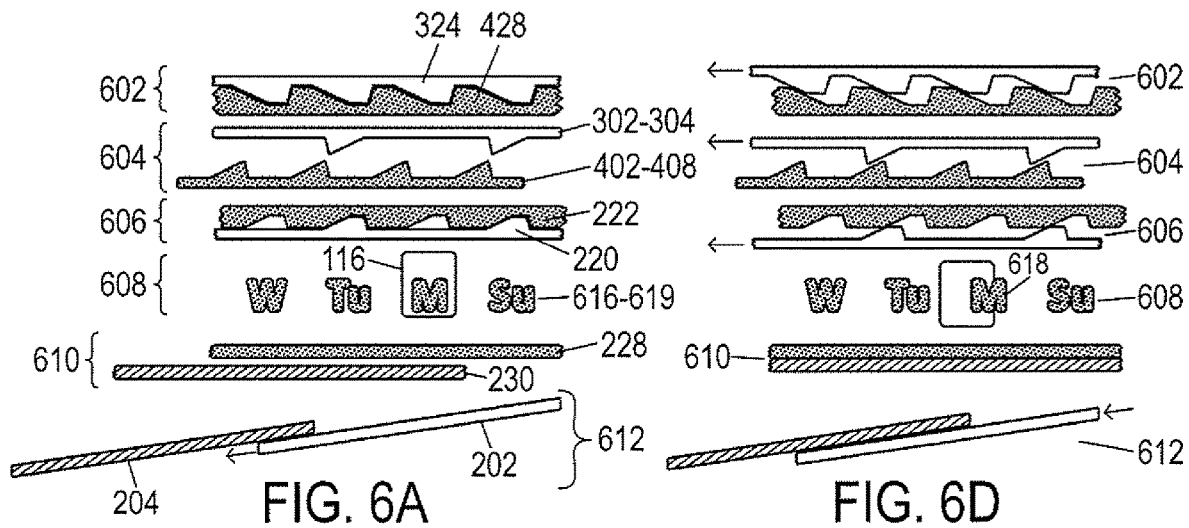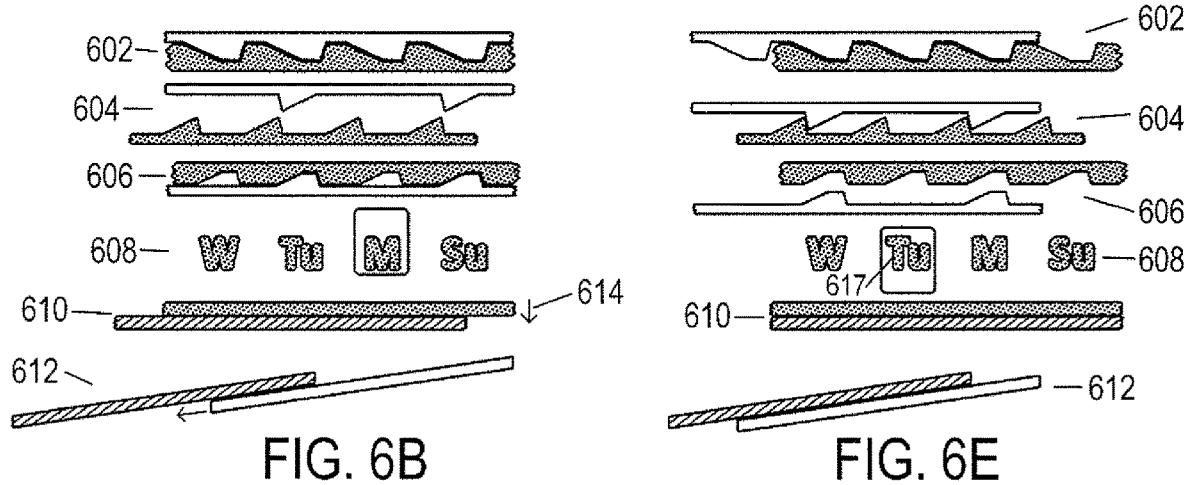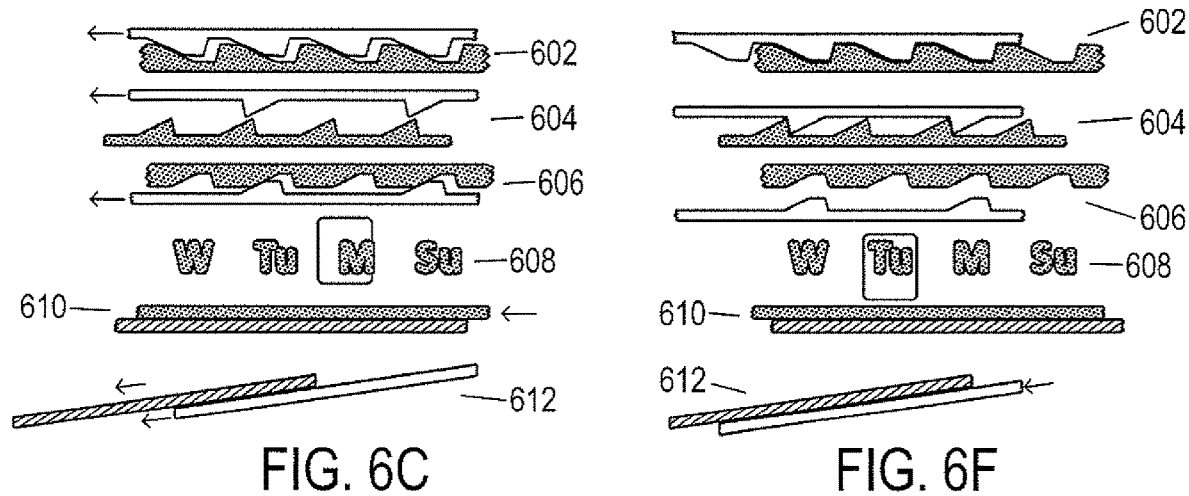

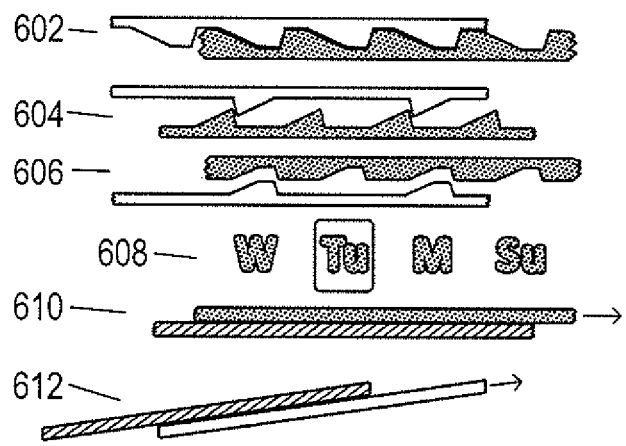
FIG. 6G
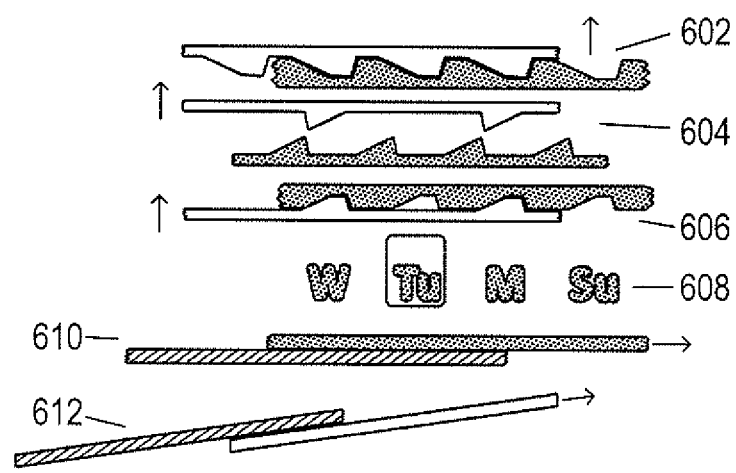
FIG. 6H
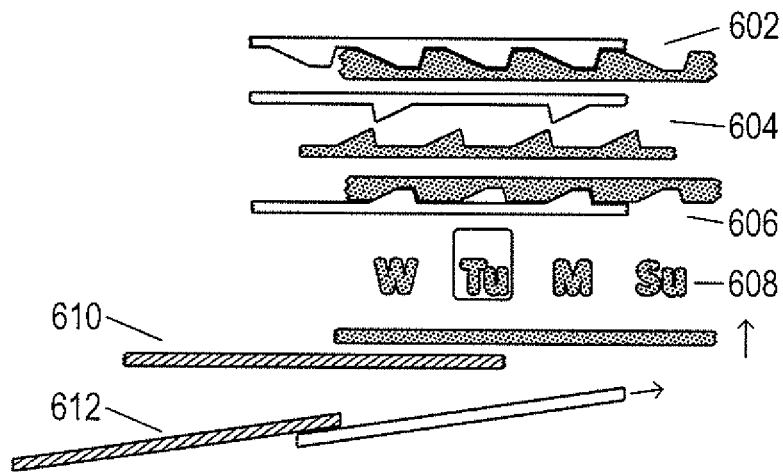
FIG. 6-I

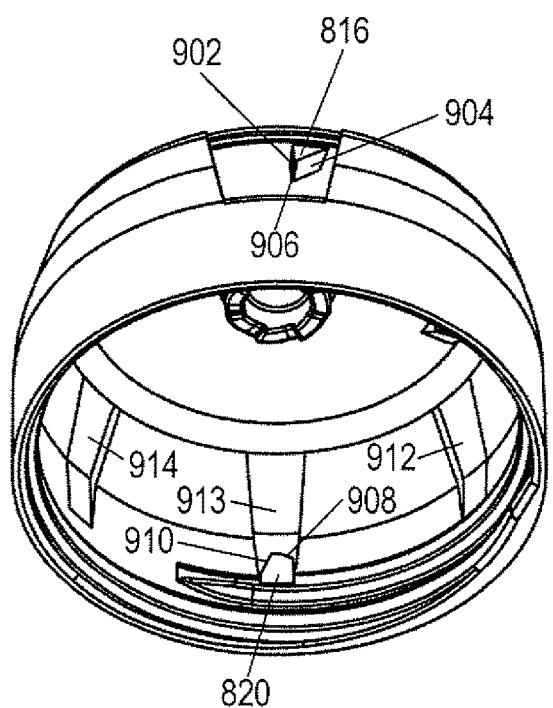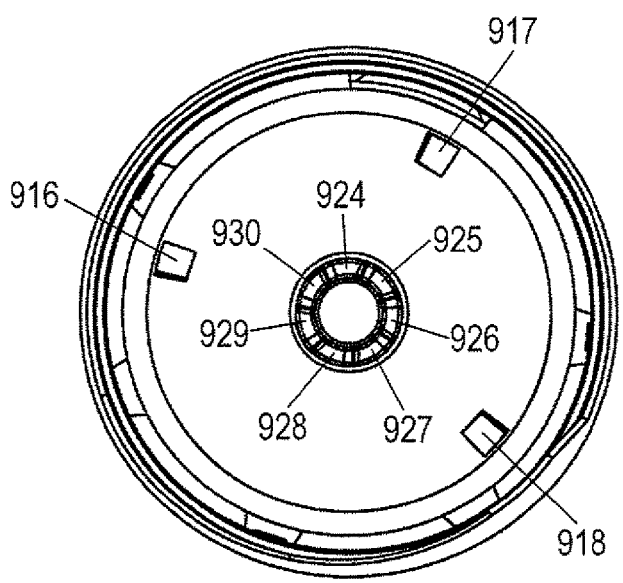
FIG. 9A  FIG. 9B
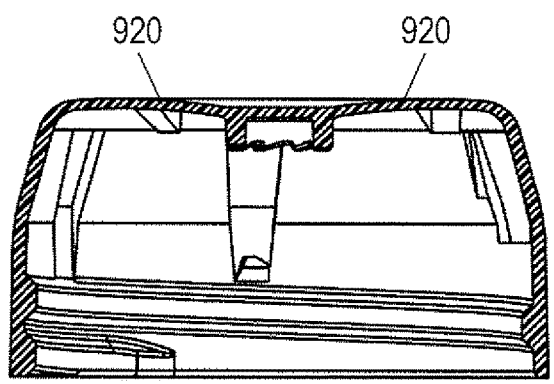
FIG. 9C

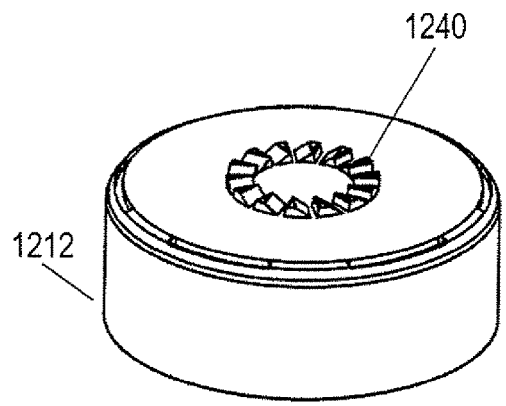
FIG. 12C
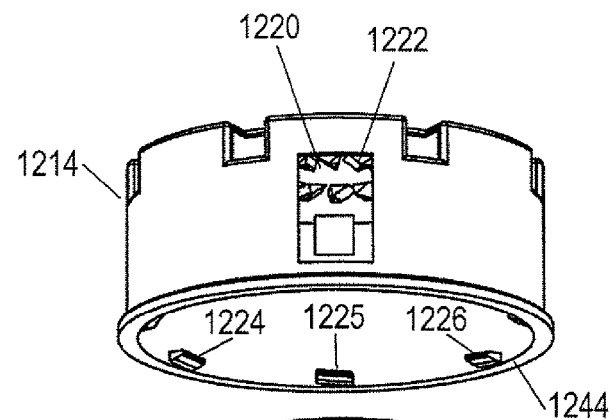
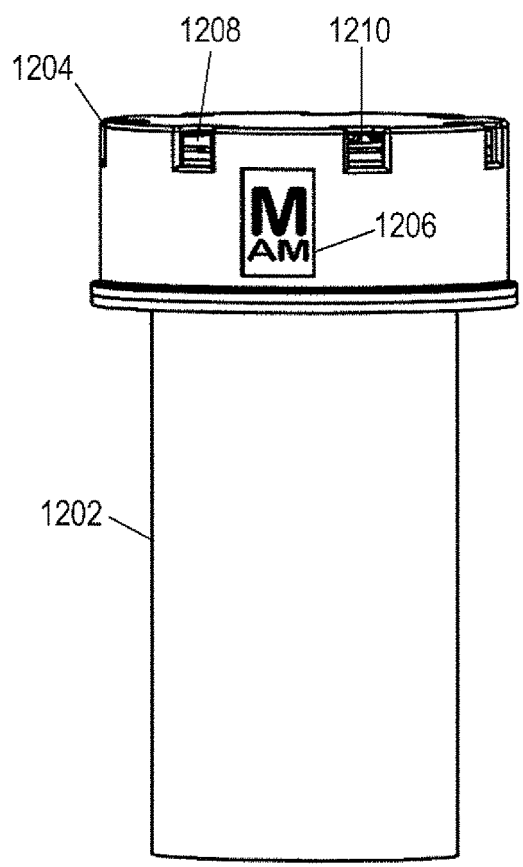
FIG. 12A
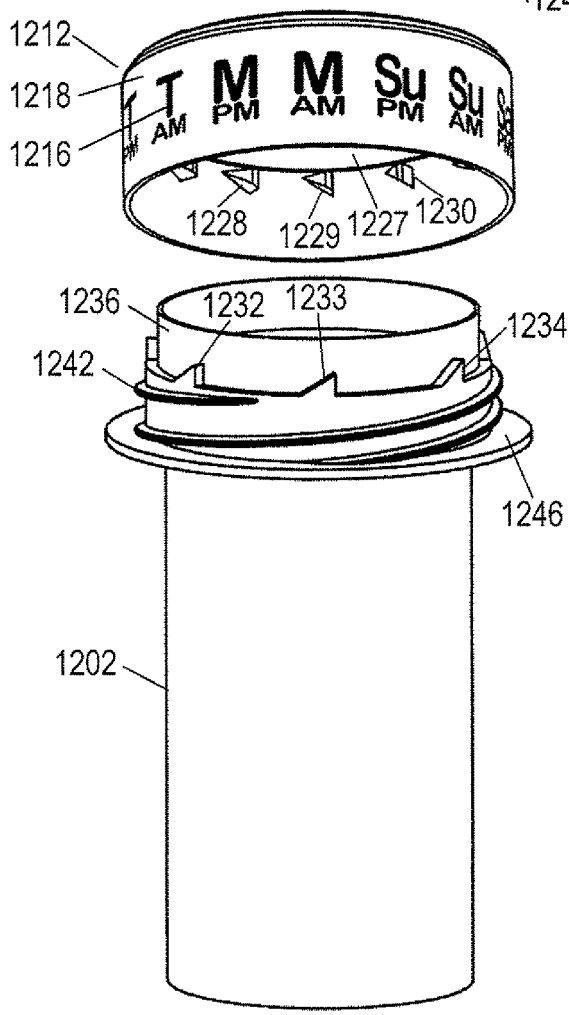
FIG. 12B

CONTAINER WITH A DISPENSING SCHEDULE

CROSS-REFERENCE TO RELATED APPLICATIONS

This application is a continuation-in-part of application Ser. No. 15/331,875, filed Oct. 23, 2016, which is a continuation of U.S. Pat. No. 9,492,356 issued Nov. 15, 2016, which claims the benefit of Provisional Patent Application No. 61/822,214, filed May 10, 2013.

TECHNICAL FIELD

The current disclosure is related to various types of containers, including pill bottles, and, in particular, to a container with a dispensing schedule that indicates when the contents within the container should next be accessed.

BACKGROUND

Failure to adhere to a prescribed medication-dosage regimen is a dangerous and ubiquitous problem. Missing a prescribed dosage of certain medications, such as blood-pressure medicine, may result in significant harm and even death. Accidental overdose of prescription medication often causes negative effects that are even more dangerous and immediate than missing a prescribed dosage.

According to the National Council on Patient Information, up to 60% of all prescribed medication is taken incorrectly. Physicians take only 75% of prescribed pills correctly. Non-compliance costs more than $300 billion a year in the USA, accounts for 13% of all hospital admissions, and causes 150,000 deaths.

In addition to prescribed medication, there are vitamins and other supplements that do not require a prescription from a doctor and that are also recommended for use according to a regular schedule. Failure to adhere to a recommended schedule may lessen the effectiveness of the vitamins and other supplements and may exposes a consumer to the risk of overdose. Pills prescribed by veterinarians for the care of animals are associated with similar risks and consequences when not used according to a prescribed dosing schedule.

Trying to determine whether or not a particular dose has already been taken or administered is, for many, an even more difficult aspect of adhering to a recommended administration schedule than remembering the times of scheduled doses. The repetitive nature of consuming pills on a daily basis can lead to confusion with regard to whether or not a particular dose that was scheduled for administration has, in fact, been administered.

Many different medicine dispensers and medicine-dispensing regimes have been proposed and developed in order to assist consumers in self-administration of drugs, vitamins, and other consumables. However, the fact that, according to current statistics, non-compliance with administration schedules continues to be a serious problem and represents a significant financial burden to consumers as well as to society, as a whole, indicates that the many proposed and currently-available regimes and dispensers have not effectively addressed problems associated with self-administration of pills by consumers.

Many medications, vitamins, and supplements are currently distributed in threaded bottles. Most often, these threaded bottles are blow-molded. Unlike injection molded bottles, a blow-molded bottle can be readily manufactured to have a neck portion smaller in diameter than the diameter of the main portion of the bottle. Blow-molded bottles can be easily scaled to have larger volumes without proportionally increasing cap sizes. Blow-molded bottles can be manufactured to have different volumes, shapes, and sizes that share a commonly sized neck and thus a commonly sized cap. Blow-molded, threaded bottles are mass-produced at low cost. A significant portion of existing manufacturing facilities and automated dispensing systems are configured to produce and use threaded bottles.

SUMMARY

The current disclosure is directed to a container with a dispensing schedule and, in various described implementations, to a container and a complementary cap that includes a dispensing schedule. During each dispensing cycle, which includes removing the cap from the container to allow access to the contents of the container and re-securing the cap to the container, the display schedule is automatically advanced to a next indication. In one implementation, the container is a bottle with a threaded neck and the cap is complementarily threaded and has a cylindrical rim and a schedule display. An indication on or within the schedule display is displayed through an aperture in the cap rim. Features included in the cap and the schedule display interoperate to ensure that the displayed indication is advanced to a next indication when the cap is unscrewed from, and subsequently threaded onto, the bottle.

BRIEF DESCRIPTION OF THE DRAWINGS

FIG. 1 shows a perspective view of a first implementation of the container with a dispensing schedule ("CDS") to which the current disclosure is directed.

FIG. 2 shows an exploded perspective of the CDS implementation shown in FIG. 1.

FIGS. 6A-I provide unwrapped views of the cap, schedule-display, and bottle components of the CDS that illustrate step-by-step interaction of these components as the cap is screwed onto, and removed from, the CDS bottle.

FIGS. 9A-C show alternative perspective views of the cap of the CDS implementation shown in FIG. 7.

FIGS. 12A-C show a third CDS implementation.

DETAILED DESCRIPTION

Figure 3A:
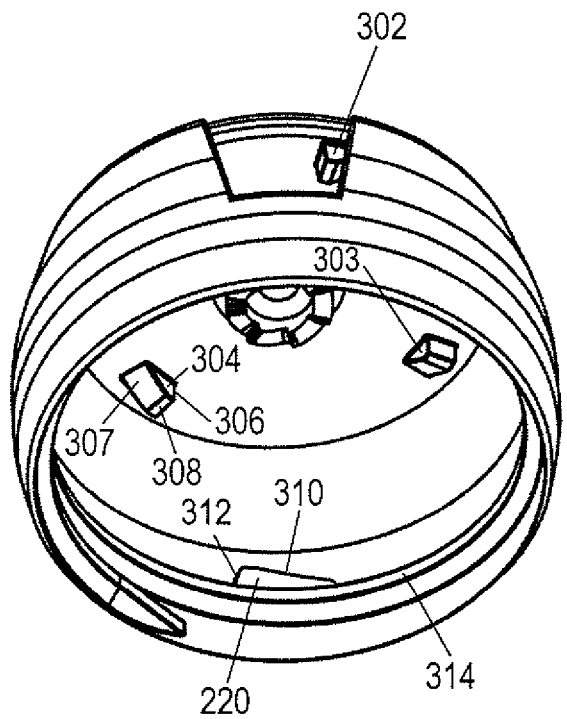
FIGS. 3A-B show alternative perspective views of the cap assembly shown in FIG. 1.

FIG. 1 shows a perspective view of a first implementation of the container with a dispensing schedule to which the current disclosure is directed. The illustrated implementation of the container with a dispensing schedule ("CDS") includes a bottle 102 with a threaded neck 104 (threads obscured by cap in FIG. 1) and a complementarily threaded cap assembly 106. Cap assembly 106 includes a cap 108 with a disk-shaped top 110 and a side wall 112 that has a curved external surface and that also includes a schedule display 114 visible through cap aperture 116. A single indication 118, printed, attached, or otherwise included on or within the schedule display, is aligned with the cap aperture 116 and is therefore visible through the cap aperture from viewpoints external to the CDS. In the example CDS implementation shown in FIG. 1, the displayed indication 118, "W," indicates that a next dose is scheduled for administration on Wednesday.

Interior features of the cap and schedule display interoperate with one another and with bottle features to ensure that the displayed indication is correctly advanced to a next indication within a circular sequence of schedule-display indications when the cap is unscrewed and removed from the bottle and then screwed back on the bottle. Unscrewing and removing the cap from the bottle followed by screwing the cap back onto the bottle constitutes a single dispensing cycle. The displayed indication is not advanced unless either the cap is successfully removed and replaced or the displayed indication is deliberately and manually advanced using manual-advancement features, discussed below.

The size and location of the cap aperture provides visibility to a surface area of the schedule display that is of sufficient size and that is properly oriented to provide a clear and easily read indication. In alternative CDS implementations, indications may be displayed parallel to the top of the cap. The schedule-display indications may vary with different CDS implementations and may include an essentially arbitrary number of different indications. The indication may, for example, indicate a portion of a day, such as "am" or "pm," may display a particular hour, such as "9," may display a day of the week, such as "W" or "Th," and may display any combination of one or more of a portion of a day, a particular hour, and a day of the week. In other CDS implementations, schedule indications may indicate precise date and/or time information. In the example CDS implementation shown in FIG. 1, the schedule display includes seven different indications, one for each day of a week, arranged in a circular sequence.

The cap assembly of the CDS implementation shown in FIG. 1 has two single-piece components. This relatively small number of components is efficiently and cost-effectively mass produced and assembled from common polymeric materials, including polypropylene and polyethylene terephthalate ("PET"). When manufactured with currently-available precision, interoperating components in the cap assembly provide for reliable advancement of the displayed indication by a single indication within the circular sequence of schedule-display indications during each dispensing cycle. CDS implementations are designed for rapid, reliable, and cost-efficient manufacturing.

The indication-advancement mechanism in the cap assembly is designed to function effectively with common threaded bottles that have narrow necks and relatively shallow thread pitches. The mechanism is robust and versatile, and is easily scaled to accommodate threaded bottles with various different neck sizes and thread designs, including threaded bottles currently used for storing medicines, vitamins, and other supplements. A significant constraint for cost-effective manufacturing is the need to minimize the number of components. The CDS implementation shown in FIG. 1, with only three single-piece components, satisfies this constraint. A single-piece component is a component that can be directly manufactured, without subsequent assembly from multiple subcomponents, such as a plastic object that is injection molded and a metal object that is cut, stamped, and/or shaped from a single continuous metal sheet or block. Each additional component within an assembly or sub-assembly adds time, cost, and complexity to the manufacturing process, which is why the above-discussed number-of-components constraint is significant.

The CDS implementation shown in FIG. 1, like the remaining CDS implementations discussed in this document, is compatible with foil seals, both induction-heat adhered and glued, that are used for tamper-resistant packaging and for isolating the interior of the bottle from the external environment. The disclosed CDS implementations are also designed to be compatible with resealable seals as well as to accommodate paper and wax seals. The currently disclosed CDS implementations also provide an aesthetically pleasing click or other notification of successful indication advancement. The currently disclosed CDS implementations incorporate both single-threaded and multi-threaded bottles, including threadings with pitches of less than 2.5 degrees, less than 5 degrees, between 1.5 and 2 degrees, between 2.0 and 2.5 degrees, between 2.5 and 3 degrees, between 3 and 4 degrees, and between 4 and 5 degrees. The currently disclosed CDS implementations maintain accurate indication advancement over an arbitrary number of dispensing cycles and manual advancements, since indication advancement is precise and robust.

FIG. 2 shows an exploded perspective of the CDS implementation shown in FIG. 1. In the exploded view, the three components of the CDS shown in FIG. 1 are visible, as are additional features of the three components. The cap 108 is shown removed from, and above, the schedule display 114. The cap 108 has an internal cap threading 202 complementary to the external threading 204 on the neck 104 of the bottle 102, allowing the cap to be screwed downward to close the bottle and to be unscrewed upward to open the bottle. Teeth, including tooth 206, on the interior surface of the top of the cap together comprise a first ratchet wheel, the teeth of the first ratchet wheel engaging with teeth of a second ratchet wheel, including tooth 208, on an upper surface 210 of the schedule display. A schedule-display-centering feature 212, located at the center of the interior surface of the cap top, engages with a centering pin 214 on the upper surface 210 of the schedule display 114 when the schedule display is assembled with the cap, ensuring that the schedule display remains centered within the cap assembly (106 in FIG. 1). The cap includes one or more catch teeth, including catch tooth 216, located towards the outer circumference of the inner surface of the cap top, which interact with seven catch teeth, including catch tooth 218, located towards the outer circumference of the upper surface 210 of the schedule display 114. The cap catch teeth and schedule-display catch teeth together provide a cap-assembly-reengagement or anti-slip feature. The number of catch teeth may vary depending on the number of schedule-display indications. A first set of one or more controlled-slip features, including controlled-slip feature 220, are disposed on the inner surface of the side wall 112 of the cap 108 to engage and interact with a second set of controlled-slip features, including controlled-slip feature 222, arranged around the bottom perimeter of the schedule display 114. Seven schedule indications are printed on, affixed to, or incorporated within the inclined, external surface 224 of the internal display schedule 114, including indication "F" 226. In addition, the schedule display 114 includes a sealing ring 228, the bottom sealing surface of which is not visible in FIG. 2, to provide an airtight, gasket-like seal between the bottle and the cap assembly when the cap assembly is screwed onto the bottle. The bottle 102 also includes a lip 230 and a stop annulus 232.

Figure 3B:
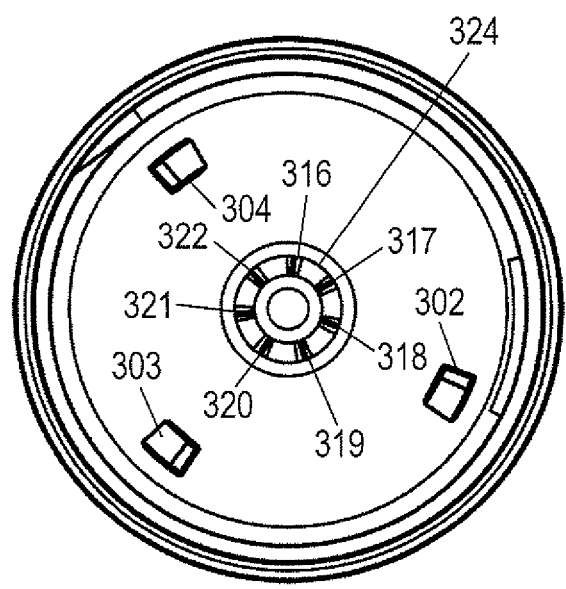

FIGS. 3A-B show alternative perspective views of the cap assembly shown in FIG. 1. As shown in FIG. 3A, the cap catch teeth 302-304 each include an engaging side 306, a tapered side 307, and a tip 308. Controlled-slip features, including controlled-slip feature 220, have both a ramp portion 310 and a steep side 312 and are located along annular support 314. FIG. 3B shows three cap catch teeth 302-304. As previously mentioned, the number of cap catch teeth may vary in different implementations. However, the angular spacing between the cap catch teeth 302-304 is an integer multiple of the angular spacing between the schedule-display catch teeth (402-408 FIG. 4A). In FIG. 3B, the angular spacing between the cap catch teeth 302-304 is a multiple of $360/7$ degrees, since there are seven schedule-display catch teeth with identical angular separations located on the upper surface of the schedule display in the disclosed implementation, as discussed above with reference to FIG. 2.

Figure 4A:
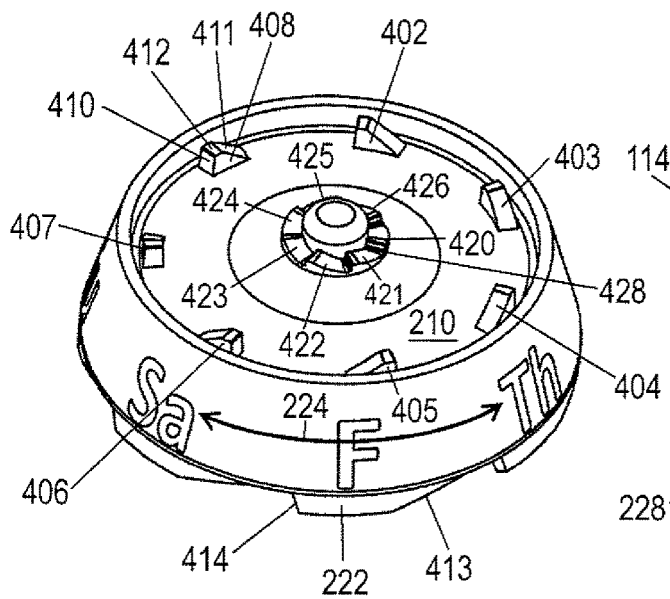
FIGS. 4A-C show alternative views of the schedule display shown in FIG. 1.
Figure 4B:
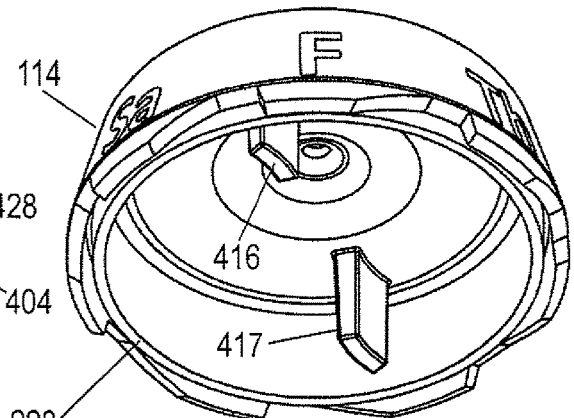
Figure 4C:
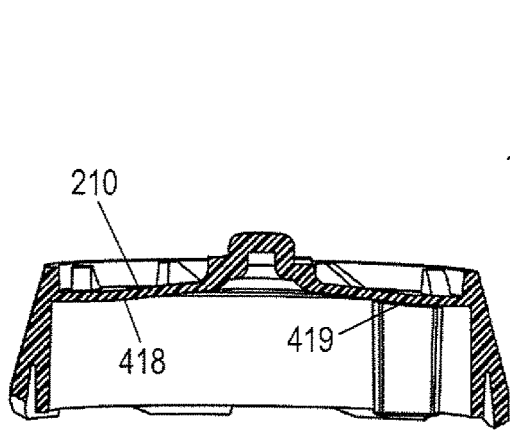

FIGS. 4A-C show alternative views of the schedule-display 114. FIG. 4A shows a perspective view of the schedule display from the top and 4B shows a perspective view of the schedule display from the bottom. As shown in FIG. 4A, the schedule-display catch teeth 402-408 each includes an engaging side 410, a tapered side 411, and a tip 412. Schedule-display controlled-slip features, including schedule-display controlled-slip feature 222, further include a ramp portion 413 and a steep side 414. As shown in FIG. 4B, the schedule display 114 further includes grips 416-417, which can be used to rotate the schedule display until a desired starting indication is visible below cap aperture 116.

Sealing lip 228 is designed for interaction with a foil or paper seal. When bottles are on a filling line, a seal placed into the cap is supported in place by sealing ring 228. The cap is then positioned on the bottle so that the seal comes into contact with the lip 230 of the bottle. In the case of an induction-adhered seal, an electric current in a nearby coil causes the metallic foil to heat and adhere to the rim of the bottle. In other cases, an adhesive or wax sealant may be used. Prior to adhering to the bottle, the circular ring of the schedule-display controlled-slip features, such as schedule-display controlled-slip feature 222, prevent the seal from slipping to an off-centered position. Grips 416-417 provide additional support by preventing flexing of the seal towards, or falling of the seal into, the interior of the schedule display.

The one or more grips, such as grip 416, are raised tabs in the implementation shown in FIG. 4B. Alternatively, the one or more grips may be a variety of different types of protrusions, indentations, or holes that can provide a similar schedule-display-positioning function in alternative CDS implementations. The one or more grips can either be part of, or connected to, the internal surface of the schedule display, the inner side of the rim of the schedule display, or both the internal surface of the schedule display and the inner side of the rim of the schedule display.

As shown in FIG. 4C, the top of the schedule display 210 includes bends 418-419. These bends, which increase the curvature of the surface of the top of the schedule display serve to provide springy resilience that maintains engagement of the two sets of ratchet-wheel teeth that include schedule-display ratchet-wheel teeth (420-426 in FIG. 4A) of the schedule-display ratchet wheel (428 in FIG. 4A) and cap ratchet-wheel teeth (316-322 in FIG. 3B) of the cap ratchet wheel (324 in FIG. 3B) when the cap is assembled and that allow vertical descent of the cap relative to schedule display.

Figure 5:
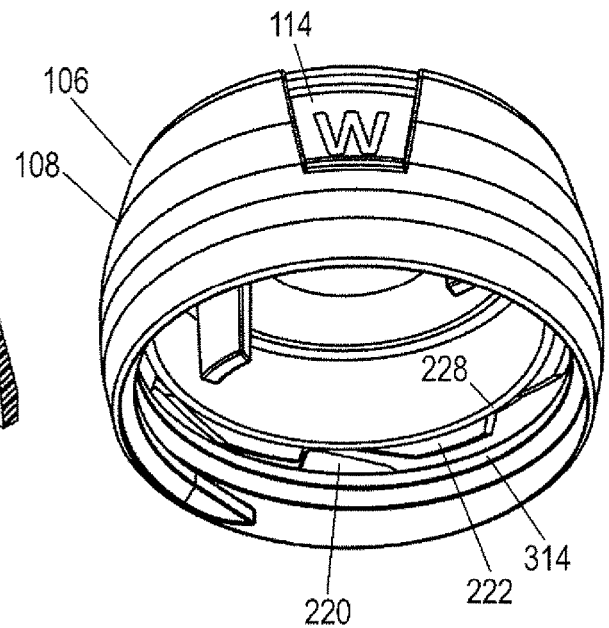
FIG. 5 shows a perspective view of cap assembly from below and the relative positions of components when the cap assembly is not threaded to the bottle.

FIG. 5 shows a perspective view of cap assembly 106 from below and the relative positions of components when the cap assembly is not threaded to a bottle. Schedule-display 114 is rotatably secured within cap 108 via annular support 314. The cap controlled-slip features, such as cap-controlled slip feature 220, fit into, and are engaged with, the schedule-display controlled-slip features, including schedule-display controlled-slip feature 222. Schedule-display ratchet-wheel teeth (420-426 in FIG. 4A) are pushed into, and meshed with, cap ratchet-wheel teeth (316-322 in FIG. 3B) via compression provided by the curved top 210 of the schedule-display as well as the flexing of the top of cap, preventing unintentional advancement of the schedule display. Cap-catch teeth tips, including cap-catch tooth tip (308 in FIG. 3A), are vertically separated and disengaged from schedule-display catch-teeth tips, including schedule-display catch-tooth tip 412. The partial engagement between the schedule display and the cap prevents the schedule display from freely rotating within the cap, but allows the schedule display to be manually rotated, by applying a rotational force to the grips 416-417 in order to select a particular schedule indication for display through the cap aperture.

When the cap assembly is applied to the bottle and rotated to close the bottle, the cap threads engage with the bottle threads and, in a screw-like fashion, the cap assembly is drawn downward over the neck of the bottle. The cap sealing ring 228 reaches the bottle lip and is pressed onto the bottle lip (230 in FIG. 2), creating an airtight seal. Contact between the cap sealing ring 228 and the bottle lip prevents the schedule display from descending further with the cap, so that, as the cap is further rotated, the cap descends further downward relative to the schedule display. A downward force from the cap is transferred to the schedule display through contact of the cap ratchet-wheel teeth (316-322 in FIG. 3B) and the schedule-display ratchet-wheel teeth (420-426 in FIG. 4A). The top of the schedule display flexes along with the top of the cap 110 to enable the cap to further descend.

The cap ratchet wheel (324 in FIG. 3B) and the schedule-display ratchet wheel (428 in FIG. 4A) are relatively small in diameter and are located near the rotational centers of both the cap and the schedule-display. The cap ratchet wheel and the schedule-display ratchet wheel transfer rotational force from the cap to the schedule display. In certain implementations, schedule-display centering feature (212 in FIG. 2) and centering pin (214 in FIG. 2) also provide a centering function. Because the sealing ring 228 and bottle lip are much farther from the rotational axis of the cap assembly than the cap ratchet wheel and the schedule-display ratchet wheel, friction between the sealing ring and bottle lip has mechanical advantage over, and thus overcomes, the friction between the cap ratchet-wheel teeth and the schedule-display ratchet-wheel teeth. In combination, these components provide a biasing function between the cap and schedule display that allows the cap to rotate relative to the schedule display from one indication to the next. Rotation of cap relative to the schedule display advances the cap aperture from a first indication to a next indication. In addition to the biasing function described above, rotation of the cap relative to the schedule display is also regulated by the controlled-slip features, including controlled-slip features 220 and 222, and the catch teeth, including the cap catch teeth (302-304 in FIG. 3B) and the schedule-display catch teeth (402-408 in FIG. 4A).

When, as the cap continues to descend downward, the cap controlled-slip features, including cap controlled-slip feature 220, and the schedule-display controlled-slip features, including schedule-display controlled-slip feature 222, engage, the engaged controlled-slip features transfer rotational force from the cap to the schedule display that overcomes the friction between sealing ring 228 and bottle lip (230 in FIG. 2) to again force the schedule display to rotate together with the cap. However, as the cap further descends and the cap controlled-slip features descend relative to the schedule-display controlled-slip features, the tapered shape of the controlled-slip-feature ramps, including controlled-slip-feature ramps (310 in FIG. 3A) and (413 in FIG. 4A), allow the schedule display to slip relative to the cap, since the schedule display is constrained by friction between the sealing ring and bottle lip. The net result is that schedule display rotates with the cap around the bottle neck, but at a slower angular rate than the cap. Advancement of the cap aperture in relationship to the schedule display, from a first indication to a next indication, involves rotating the cap by a greater angle around bottle neck than the angular spacing between indications. The angle by which the cap is rotated to advance aperture from a first indication to a next indication increases the vertical distance by which cap descends relative to the schedule display. This allows the cap catch teeth to descend into lateral alignment with the schedule-display catch teeth despite the shallow pitch of bottle threads. When the cap assembly is placed onto the bottle and when the cap 108 rotates around the schedule display, the tips of the cap catch teeth rotate over and past the tips of the schedule-display catch teeth. When the cap aperture reaches and centers over a next sequential indication, the engaging sides of the cap catch teeth, such as the engaging side 306 shown in FIG. 3A, collide with the engaging sides of the schedule-display catch teeth, preventing further relative rotation between the cap and schedule display. Were the cap further screwed down onto the bottle neck, the schedule display rotates together with the cap, ensuring that the next sequential indication remains centered within the cap aperture. Eventually, further rotation of the cap is impeded by bottle stop annulus.

At the start of each dispensing cycle, the cap ratchet-wheel teeth are fully meshed with the schedule-display ratchet-wheel teeth. Advancing the cap aperture to a next sequential indication advances the cap ratchet-wheel teeth from one fully engaged and meshed position to a next fully engaged and meshed position.

When the cap assembly is removed from the bottle by rotating it in a direction opposite from the direction in which the cap assembly is screwed onto the bottle, the cap ratchet-wheel teeth engage the schedule-display ratchet-wheel teeth to force the schedule display to rotate together with the cap. During removal of the cap assembly from the bottle, the cap aperture remains centered over an indication. Tension between the top of the schedule display and the cap top forces the schedule display onto the annular support 314 shown in FIG. 3A. Each cap-controlled-slip feature ramp is aligned with, and engages with, a next schedule-display controlled-slip-feature ramp. The cap catch teeth separate from schedule-display catch teeth. The cap assembly, once removed, is ready for another dispensing cycle.

FIGS. 6A-I provide unwrapped views of the cap, schedule display, and bottle components of the CDS that illustrate step-by-step interaction of these components as the cap is screwed onto, and removed from, the CDS bottle. In FIGS. 6A-I, interactions between six different pairs of features are shown, next identified with respect to FIG. 6A. A first pair of features 602 includes: (1) the cap ratchet wheel (324 in FIG. 3B); and (2) the schedule-display ratchet wheel (428 in FIG. 4A). A second pair of features 604 includes: (1) the circular set of cap catch teeth (302-304 in FIG. 3B); and (2) the circular set of schedule-display catch teeth (402-408 in FIG. 4A). A third pair of features 606 includes: (1) the circular set of schedule-display controlled-slip features, including cap controlled-slip feature 220 shown in FIG. 3A; and (2) the circular set of cap controlled-slip features, including schedule-display controlled-slip feature 222 shown in FIG. 4A. A fourth pair of features 608 includes: (1) the cap aperture (116 in FIG. 1) in the cap rim; and (2) the schedule-display indications 616-619. A fifth pair of features 610 includes: (1) the schedule-display sealing ring (228 in FIG. 2); and (2) the bottle lip (230 in FIG. 2). A sixth pair of features 612 includes: (1) the cap threading (202 in FIG. 2); and (2) the bottle threading (204 in FIG. 2). In FIGS. 6A-I, different types of crosshatching are used to distinguish the components and/or features in each pair. Also, in FIGS. 6B-6D and 6F-6I, small arrows, such as small arrow 614 (see FIG. 6B), are used to indicate relative motion of one of a pair of features with respect to another feature of the pair of features.

FIGS. 6A-F illustrate the process of affixing the cap assembly to the bottle and the interaction of the various features and components during this process. As shown in FIG. 6A, prior to screwing the cap assembly onto the bottle, the cap controlled-slip features and the schedule-display controlled-slip features are meshed together 606, fixing the position of the schedule display with respect to the cap. As discussed above, downward pressure from the top of the cap is transferred to the schedule display, promoting meshing of the cap controlled-slip features with the schedule-display controlled-slip features. The cap ratchet teeth are aligned and engaged with the schedule-display ratchet teeth 602. Schedule-display catch teeth are aligned with, but disengaged from, cap catch teeth 604.

When the cap assembly is placed onto the bottle and rotationally adjusted, the cap threading starts traveling along the bottle threading 612. As shown in FIG. 6B, when the cap assembly is rotated in a clockwise direction, the schedule-display sealing ring comes into contact with the bottle lip 610.

As shown in FIG. 6C, as the cap assembly continues to be rotated in a clockwise direction, the engagement between the schedule-display sealing ring and the bottle lip 610 prevents the schedule display from descending further as the cap continues to descend along the bottle threading. The rotation of the schedule display with respect to the bottle is hindered by interaction of the schedule-display sealing ring and the bottle lip 610, while the cap continues to rotate with respect to the bottle, moving the aperture in the rotation direction relative to the schedule display and initiating advancement of the displayed indication 608. Flexing of the top of the cap as well as the top of the schedule display allows the cap to descend with respect to the schedule display, which is prevented from descending by engagement of the schedule-display sealing ring and the bottle lip 610. The downward force from the cap is primarily transferred to the schedule display through the cap and schedule-display ratchet wheels. As discussed above, the cap and schedule-display ratchet wheels are centrally disposed relatively closely to center of the cap and the center of the schedule display, respectively. Because the rotational component of the force is transferred to the schedule display near the axis of rotation, where the mechanical advantage with respect to inducing rotation is quite low, the rotational component of the transferred force cannot overcome the friction-induced resistance to rotation arising from the interaction between the schedule-display sealing rim and the bottle lip 610. The friction between the sealing ring and the bottle lip combined with the centrally located position of the force-transference provides a biasing function that induces rotation of the cap with respect to the internal scheduling display.

As the cap threading follows the path of the bottle threading 612, the cap continues to descend downward with respect to the bottle neck. The descent of the cap in the vertical direction allows the ramp portions of the cap controlled-slip features to travel along the descending paths of the ramp portions of the schedule-display controlled-slip features 606 so that the cap advances relative to the schedule display. The schedule-display controlled-slip features and the cap controlled-slip features therefore begin to slide out of engagement with each other 606. The slope of the ramps is greater than the slope of the bottle threading, which has a relatively small pitch angle, often between 2° and 3°. Thus, the cap needs to rotate about the container axis of symmetry over a first angle with respect to the bottle that is greater than a second angle over which the cap needs to rotate with respect to the schedule display in order to achieve the amount of vertical descent needed to release the schedule-display controlled-slip features from the cap controlled-slip features. As a result, despite friction between the schedule display and bottle, until the controlled-slip features are released, the cap forces the schedule display to rotate with respect to the container over a third angle that is the difference between the first and second angles. The first angle of rotation of the cap with respect to the bottle is therefore greater than the third angle of rotation of the schedule display with respect to the bottle, allowing the cap to slip ahead of the schedule display.

The slippage of the cap with respect to the schedule display, in turn, provides for advancement of the displayed indication within the cap aperture 608. The controlled-slip between the cap and the schedule display results in a continuous but attenuated rotation of the schedule display so that a user rotates the cap further with respect to the bottle than the schedule display is rotated with respect to the bottle, advancing the cap aperture to a next schedule indication. Thus, the interoperation of the controlled-slip features of the cap and the controlled-slip features of the schedule display compensate for the shallow thread pitch on the threaded bottle, providing sufficient vertical drop between the cap and the schedule display during rotation from one indication to the next indication to allow the indication mechanism components to function properly. Relatively little friction is created by the rotation of the cap with respect to the schedule display, as a result of which the cap screws onto the bottle smoothly during the indication-advancement process while rotation of the cap with respect to the schedule display increases as the rotation of the schedule display with respect to the bottle slows and finally stops.

As shown in FIG. 6C, the tips of the cap catch teeth rotate past the tips of the schedule-display catch teeth 604, and the cap is drawn further downward relative to schedule display as the tips of the cap catch teeth slip below the tips of the schedule-display catch teeth. The tapered sides of the catch teeth facilitate slipping between the cap catch teeth and the schedule-display catch teeth. The cap ratchet teeth start to slide out and away from the schedule-display ratchet teeth along the tapered sides of the ratchet teeth 602.

In FIG. 6D, as the cap continues to rotate with respect to the bottle and schedule display, the cap aperture advances further in a clockwise direction with respect to the "M" indication 618. The tapered sides of cap catch teeth descend further with respect to the tapered sides of the schedule-display catch teeth 604. The cap controlled-slip features are partially released from the schedule-display controlled-slip features 606 as the ramps of the cap controlled-slip features slide to the ends of the schedule-display ramps. When the cap controlled-slip features are fully released from the schedule-display controlled-slip features, resistance to further rotation of the cap with respect to the schedule display decreases. Therefore, the torque applied to initiate indication advancement is generally sufficient to carry through an indication-advancement cycle, with a next indication displayed through the cap aperture at cycle completion, as shown in FIG. 6E. In other words, when a CDS user applies sufficient force to the cap to initiate indication advancement, the cap glides through the remaining portion of the indication-advancement cycle without a need for subsequent application of substantial additional force.

As shown in FIG. 6E, the cap controlled-slip features 606 and the schedule-display controlled-slip features 606 are disengaged and realigned for future engagement. The cap reengages the schedule display when cap catch teeth advance forward to again engage with schedule-display catch teeth 604, preventing further advancement of the cap around the schedule display. Each cap ratchet tooth slips into engagement with a next sequential schedule-display ratchet tooth. The cap aperture displays a next schedule indication having an indication "Tu" 617. The indication-advancement cycle started in FIG. 6A is complete in FIG. 6E. Screwing the cap assembly onto the bottle results in advancement of the displayed schedule indication by one and only one indication along the sequence of schedule indication disposed along the schedule-display-rim surface.

FIG. 6F shows the cap continuing to be rotated in a clockwise direction, further tightening the cap on the bottle following the completion of the indication-advancement cycle, discussed above with reference to FIG. 6E. The cap catch teeth fully engage with the schedule-display catch teeth 604, compelling the schedule display to rotate with the cap so that the cap aperture remains centered over indication 617.

Note that, as shown by the configuration of feature pairs in FIG. 6A, when an attempt is made, but fails, to properly place the cap onto the bottle and the bottle lip and schedule-display sealing ring fail to make contact, the schedule-display controlled-slip features and cap controlled-slip features are fully meshed, cap ratchet teeth and schedule-display ratchet teeth are also fully engaged, and cap catch teeth and schedule-display catch teeth do not slip past one other, preventing the cap and the cap aperture from inadvertently rotating with respect to the schedule display and changing the displayed indication. Therefore, the display advances to a next indication only when the cap is successfully screwed onto to the bottle. Also, note that indication-advancement finishes before the cap is completely fastened to the bottle, thus ensuring that a user rotates the cap far enough to complete the indication-advancement process. There is no motion and no extra steps needed to advance the indication other than screwing the cap onto the bottle.

Note that, in the CDS implementation shown in FIGS. 1-6, the engaging sides of the cap and schedule-display ratchet teeth are not perpendicular to their bases, but are instead slightly slanted away from the tapered sides so that the inside angles between the engaging sides and the bases are acute. This slant reduces an advancement angle over which a cap ratchet tooth needs to advance in order to engage with a next schedule-display ratchet tooth, so that the advancement angle is less than the internal angle subtended by a ratchet tooth. As a result, the number of cap and schedule-display ratchet teeth can be equal to the number of schedule indication. Furthermore, this slant also allows a cap ratchet tooth to reach a next schedule-display ratchet tooth slightly before the cap aperture is centered over a next schedule indication and before the engaging sides of the cap catch teeth collide with the engaging sides of the schedule-display catch teeth. Alternatively, to achieve the same effect, the rotational positions of the cap ratchet teeth may be adjusted so that they reach the next sequential schedule-display ratchet teeth before the cap aperture is centered over a next schedule indication. As a result, the example CDS implementation advances by exactly one indication each time the cap assembly is screwed onto the bottle despite a range of user and manufacturing variations as well as potential wear from use. The difference in timing between the cap ratchet teeth snapping into place with the schedule-display ratchet teeth and cap catch teeth snapping into place with schedule-display catch teeth is sufficiently slight so that it is generally imperceptible to users.

FIGS. 6G-I illustrate components and features of the CDS implementation of FIG. 1-6F as the cap is removed from the bottle. As shown in FIG. 6G, to remove a cap, the cap is rotated in a counter-clockwise direction, with the threading of the cap traveling along the threading of the bottle 612. As the cap lifts from the bottle, the cap catch teeth start to lift out of engagement with schedule-display catch teeth 604, with the engaging sides of the cap catch teeth lifting vertically from the engaging sides of the schedule-display catch teeth. The slanted surface of the engaging sides eliminates frictional forces during vertical separation of the two sets of catch teeth. Engaging sides of the cap ratchet teeth push the engaging sides of the schedule-display ratchet teeth, compelling the schedule display to rotate in cooperation with the cap 602. Furthermore, compression created by in the cap top pushes the schedule display downward against the bottle as the cap lifts away from the schedule display. Additionally, schedule-display controlled-slip features are pushed downward into alignment with the cap controlled-slip features 606.

As shown in FIG. 6H, the cap continues to rotate in the counter-clockwise direction. The cap catch teeth and the schedule-display catch teeth have separated and are fully disengaged 604. The cap controlled-slip features and schedule-display controlled-slip features have settled back into their original engagement positions 606. Finally, as shown in Figure in 6I, the internal cap thread is ready to disengage from the external bottle threading 612. Schedule-display sealing ring has lifted from the bottle lip 610. During the sequence of steps shown in FIGS. 6G-I, the schedule display is fixed in rotational position with respect to the cap as a result of intermeshing of the cap ratchet teeth and the schedule-display ratchet teeth 602, preventing schedule display from unintentionally advancing.

In the example CDS implementation shown in FIGS. 1-6, the cap ratchet teeth and schedule-display ratchet teeth form a ratchet in the clockwise direction. This function can also be provided by a variety of mechanisms connecting the top of the schedule display to the bottom of the cap, including, prongs, pawls, or a variety of different types of projections, notches, or grooves on one component and a complementary mechanism on the other. A ratchet means may alternatively be established in other locations between the outside of the schedule display and the inside of the cap. For example, a ratchet can be located around the side wall of the schedule display and the inside of the side wall of the cap. Furthermore, the schedule-display ratcheting features can have a variety of shapes that provide a side, on each schedule-display ratcheting feature, to engage cap ratcheting features, when rotated in one direction, and a side along which the cap ratcheting features can slide, when rotated in the other direction.

The display surface of schedule display of the CDS implementation shown in FIGS. 1-6 provides sufficient space for large-characters and large-symbol indication within schedule indications. In alternative CDS implementations, the schedule indications are instead located on the disk-shaped surface of the schedule display and the cap aperture is located on the top face of the cap. In yet other CDS implementations, the cap aperture is replaced with an indicator or arrow which designates or points to an individual schedule indication in each allowed position following initial positioning or indication advancement. In certain implementations, the placement of the indicator and schedule indications is swapped so that the schedule indications are on the cap and the indicator is on the schedule display.

Schedule indications can be printed, imprinted, embossed, debossed, or adhered. A method utilized for manufacturing the currently described implementation involves a two-shot molding in which a first color of plastic is injected into the schedule-display mold to fill either the schedule indication or the body of the schedule display. A portion of the mold is removed and a second color of plastic is injected so that the schedule indications consist of a different color plastic than the body.

Figures 7, 8:
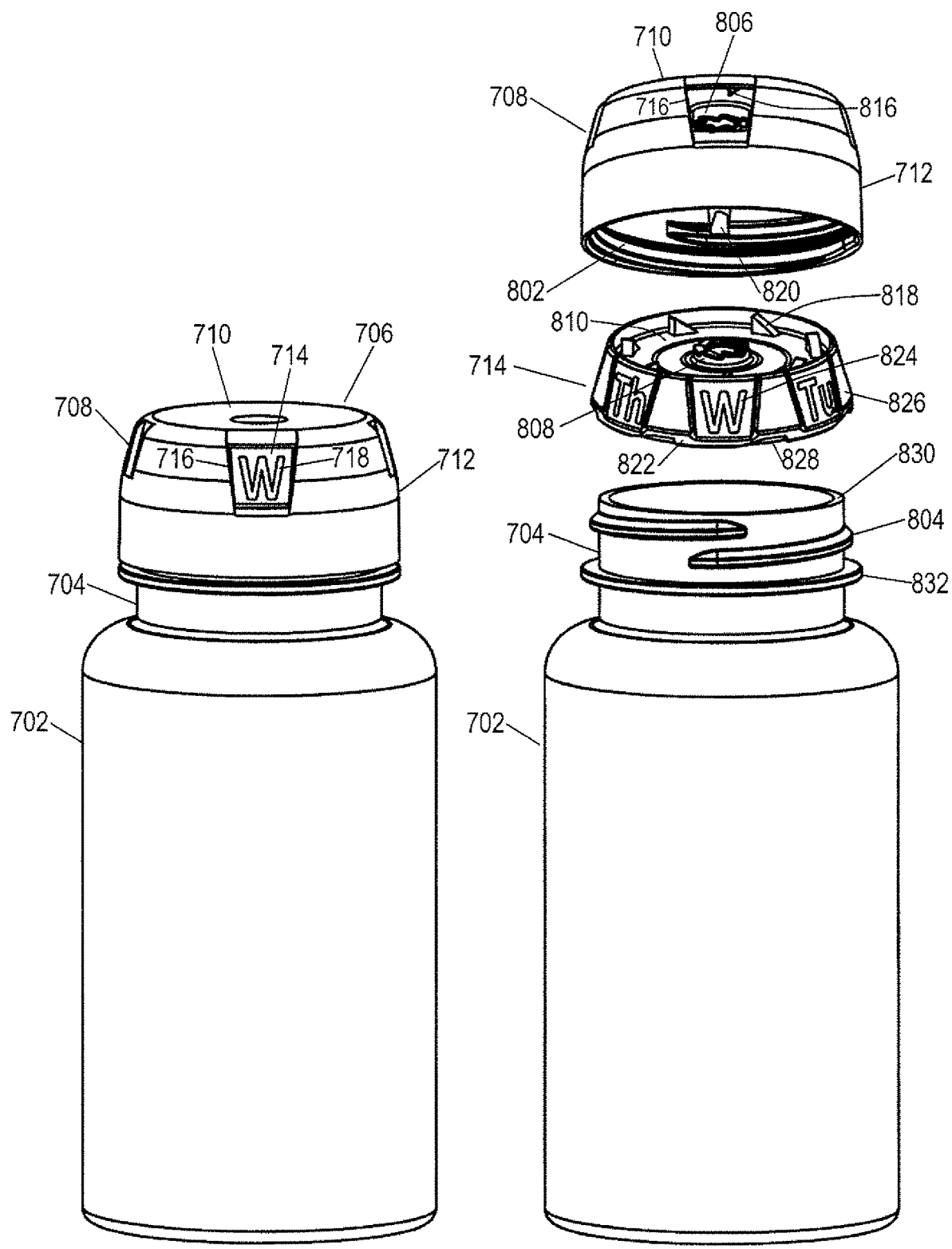
FIG. 7 shows a perspective view of a second implementation of the container with a dispensing schedule ("CDS") to which the current disclosure is directed.
FIG. 8 shows an exploded perspective of the CDS implementation shown in FIG. 7.

FIG. 7 shows a perspective view of a second implementation of the container with a dispensing schedule to which functions in a similar manner to the implementation shown in FIG. 1. The illustrated implementation of the container with a dispensing schedule ("CDS") includes a bottle 702 with a threaded neck 704 and a complementarily threaded cap assembly 706. Cap assembly 706 includes a cap 708 that includes a top 710 and side wall section 712 and that also includes an internal schedule display 714 visible through cap aperture 716. A single indication 718, printed, attached, or otherwise included on the schedule display, is aligned with the indication-display aperture 716 for display to a user. In the example CDS implementation shown in FIG. 7, the displayed indication 718, "W," indicates to a user that a next dose is scheduled to be administered on Wednesday.

Like the first implementation, interior features of the cap and internal schedule display interoperate with one another and with bottle features to ensure that the displayed indication is correctly advanced by one indication along the sequence of indications contained within a circular sequence of indications when the cap is removed from, and replaced on, the bottle. The displayed indication is not advanced unless the cap is successfully removed and replaced or the displayed indication is deliberately and manually advanced using manual-advancement features, as described for the implementation in FIG. 1. The displayed indication is visible through the indication-display aperture in the cap rim, ensuring that there is adequate available surface area on which to provide a clear and easily read indication. In alternative CDS implementations, indications may be displayed from the top of the cap. As described for the implementation shown in FIG. 7, the particular form of the indications for when a next dose is to be administered or self-administered may vary with different CDS implementations and may include an essentially arbitrary number of different elements, or indications. In the example CDS implementation shown in FIG. 7, the internal schedule display includes seven schedule elements one for each day of a week.

Also, like the implementation shown in FIG. 1, the CDS implementation shown in FIG. 1 can be inexpensively manufactured from commonly used polymeric materials and is designed for rapid, reliable, and cost-efficient manufacturing. The cap assembly is designed to function effectively with common threaded bottles that have a narrow neck portion with a relatively shallow thread pitch.

The cap assembly of the CDS implementation shown in FIG. 7 has two single-piece components, for example, which represents a relatively small number of components that can be efficiently and cost-effectively mass produced and assembled. The implementation shown in FIG. 7 is compatible with a variety of seals, and is designed to support induction heat affixed foil seals. The cap assembly provides an airtight, moisture impermeable, seal without the addition of a foil, paper or wax seal, creates an aesthetically pleasing click or other physical indication of indication advancement, is usable both for single-thread and multi-thread bottle threading, works with various thread pitches, and is usable over an arbitrary number of dispensing-schedule cycles.

The implementation shown in FIG. 7 can be used both for single-thread and multi-thread bottle threading, including a threading with a thread pitch of less than 2.5 degrees, a thread pitch of less than 5 degrees, a thread pitch of less than 10 degrees, a thread pitch of between 1.5 and 2 degrees, a thread pitch of between 2.0 and 2.5 degrees, a thread pitch of between 2.5 and 3 degrees, a thread pitch of between 3 and 4 degrees, and a thread pitch of between 4 and 5 degrees, and can continued to be used over an arbitrary number of dispensing-schedule cycles, since indication advancement is precise.

FIG. 8 shows an exploded perspective of the CDS implementation shown in FIG. 7. In the exploded view, three components of the CDS shown in FIG. 7 are visible, as are additional features of the three components. The cap 708 is shown removed from, and above, the internal schedule display 714. The cap 708 has internal cap threading 802 that allows it to be screwed onto the bottle 702 by engaging with external threading 804 on neck 704 of the bottle 702. Ratchet-wheel teeth, including ratchet-wheel tooth 806, on the cap engage with ratchet-wheel teeth, including ratchet-wheel tooth 808, on curved disk-shaped surface 810 of the schedule display. The cap includes one or more catch teeth, including catch tooth 816, which interact with the seven catch teeth, including catch tooth 818, on surface 810 of the schedule display. As described for the implementation in FIG. 1, the cap catch teeth and the schedule-display catch teeth together provide a reengagement, anti-slip or stop feature between the cap and schedule display. The number of catch teeth varies depending the number of indications. One or more controlled-slip features, including control feature 820, are arranged along the inner wall of the cap 708 to engage and interact with controlled-slip features, including controlled-slip feature 822, around the bottom perimeter of schedule display 714. Schedule display 714 includes seven schedule indications, including schedule indication "W" 824. The seven indications are arranged along the display surface 826 of schedule display 714. Unlike the implementation in FIG. 1, the surface areas for the indicia are indented from the outer surface of schedule display 714, which prevents wear of indicia during insertion of the schedule display into the cap and during use. The schedule display also includes sealing ring 828 to provide an airtight, gasket-like seal between the bottle and the cap assembly when the cap assembly is screwed onto the bottle. The bottle 702 includes a lip 830 and a stop annulus 832.

FIGS. 9A-B show alternative perspective views, from below, of the cap shown in FIG. 7. As shown in FIG. 9A catch teeth, including cap tooth 816, include an engaging side 902, a tapered side 904, and a tip 906. Controlled-slip features, including controlled-tip feature 820, have a different shape than the controlled-slip features of the first implementation to aid in rapid molding, but provide the same function and include a ramp portion 908 and a steep side 910. Apertures 912-914 aid in rapid molding and serve as a grip for adhering and removing the cap. FIG. 9B shows three cap catch teeth 916-918. The number of catch teeth 916-918 may vary. The spacing between the catch teeth is an integer multiple of the spacing between the catch teeth on the schedule display, including schedule-display catch tooth 818.

FIG. 9C shows a cross-section of the cap. The curved portion 920 of cap top increases the flexibility and resilience of the cap. When the cap is screwed onto the bottle, the cap descends down the bottle threads while the schedule display is blocked from descending by the bottle. Flexibility between the top of the cap and the top of the schedule display absorbs the compression and allows the cap to descend. When the cap is left on the bottle over time, compression can cause materials to fatigue or creep, slowly conforming to the shape onto which they are compressed, resulting in decreased resilience. The curved portion of the cap top 920 distribute stress from compression evenly and to a larger area to reduce the stress in any one area, preventing fatigue and creep.

Figure 10A:
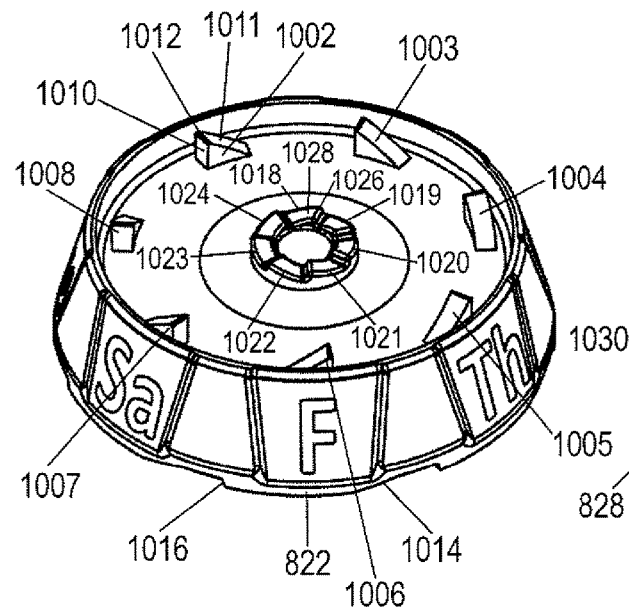
FIGS. 10A-C show alternative perspective views of the schedule display of the CDS implementation shown in FIG. 7.
Figure 10B:
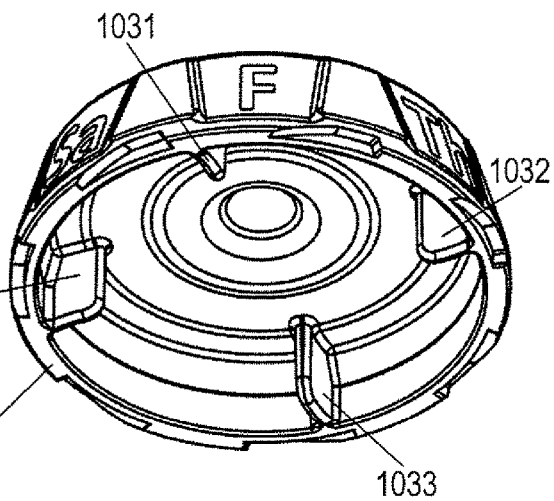
Figure 10C:
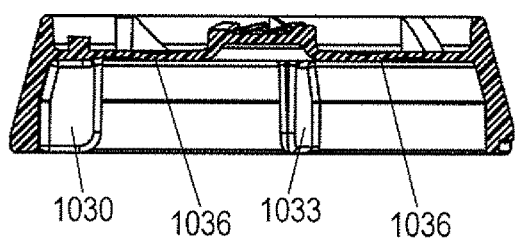

FIGS. 10A-B show alternative perspective views of the schedule display. FIG. 10A shows the schedule display from the top and 4B shows the schedule display from the bottom. FIG. 10C shows a section view of the schedule display.

In FIG. 10A, schedule-display catch teeth 1002-1008 each includes an engaging side 1010, a tapered side 1011, and a tip 1012. Controlled-slip features, including controlled-slip feature 822, each includes a ramp portion 1014 and a steep side 1016. Ratchet teeth 1018-1024 each includes a tip 1026 and a sliding side 1028. Both the tips and sliding sides slant downward from the outer edges towards the inner edges and are complementary to cap ratchet teeth 924-930 shown in FIG. 9B, which provides for centering and which eliminates the centering pin and feature in the implementation shown in FIG. 1.

As shown in FIG. 10B, the schedule display includes grips 1030-1033 which can be used by human fingers to rotate the schedule display until a desired starting indicium is visible through the cap aperture. The grips can be a variety of raise tabs, protrusions, indentations, or holes that provide a schedule-display-positioning function. These features are either part of, or connected to, the lower disk-shaped surface of the schedule display, the inner side of the rim of the schedule display, or connected to both.

The sealing lip 828 is designed for placement of a foil or paper seal. In this implementation, prior to adhering to the bottle, a seal is held laterally by the inside of cap side wall. When the bottles are on a filling line, a seal is placed inside the cap and supported by sealing ring 828. The cap is placed onto the bottle so that the seal comes into contact with the bottle lip (830 in FIG. 8). In the case of an induction adhered seal, electricity is run through a nearby coil, causing the metallic foil to heat and adhere to the rim of the bottle. Unlike the first implementation, FIG. 10B shows four grips 1030-1033 which further enhance support of a foil seal.

FIG. 10C also shows the bend 1036 in the surface the of schedule display which serves to distribute flexing and stress in order to provide springy resilience, to keep sets of ratchet-wheel teeth 924-930 and 1018-1024 engaged when the cap is assembled, and to allow vertical descent of the cap 708 relative to schedule display. In addition to these bends, the surface of the schedule display has varying thicknesses which also serve to further distribute flexing and stress.

Figure 11:
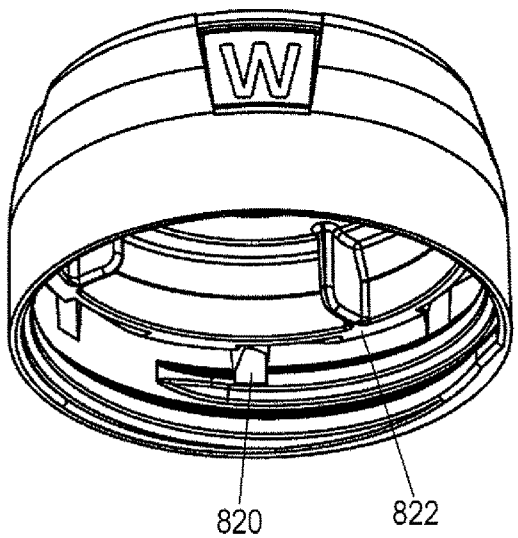
FIG. 11 shows a perspective view of the cap assembly of the CDS implementation shown in FIG. 7.

FIG. 11 shows a perspective view of the cap assembly (706 in FIG. 7) from below and the relative position of components when the cap assembly is not threaded to a bottle. The schedule-display is rotatably secured within cap via controlled-slip features, including controlled slip feature 820, which are engaged into schedule-display controlled-slip features, including schedule-display controlled-slip feature 822. Schedule-display ratchet-wheel teeth (1018-1024 in FIG. 10A) are pushed into and meshed with cap ratchet-wheel teeth (924-930 in FIG. 9B) via compression provided by schedule-display curved surface as well as the flexing of the top surface of the cap, thus preventing unintentional advancement. The cap catch teeth tips are vertically separated and disengaged from schedule display catch teeth tips. While the partial engagement between the schedule display and the cap prevents the schedule display from freely rotating within the cap, but allows the schedule display to be manually rotated in order to select a particular schedule element for display through the cap aperture 716 by applying a rotational force to grips 1030-1033 shown in FIG. 10B.

FIGS. 12A-C show a third CDS implementation. As shown in FIG. 12A, the third CDS implementation includes a bottle 1202 and a cap assembly 1204. The cap assembly includes a display aperture 1206 through which an indication is displayed, as in the above described first and second implementations as well as additional apertures, including apertures 1208 and 1210.

As shown in FIG. 12B, a schedule display 1212 that fits within an outer cap 1214 together compose the cap assembly. The schedule display includes, in the implementation shown in FIGS. 12A-C, 14 indications, including indication 1216, uniformly spaced on a display surface 1218. The outer cap 1214 includes a cap ratchet wheel 1220 with 14 cap ratchet-wheel teeth, including cap ratchet tooth 1222. The CDS implementation shown in FIGS. 12A-C also includes 7 cap lugs, including cap lugs 1224-1226, uniformly spaced along the inside of the bottom edge of the cap rim.

In addition to the cap lugs and the ratchet wheels, the cap assembly also includes schedule-display inner sealing side wall 1227 and 14 schedule-display biasing features, including schedule-display biasing features 1228-1230, that extend inward, in radial directions, from the inner surface of the schedule-display rim and that engage with bottle biasing features, including bottle biasing features 1232-1234, that are positioned along the bottom edge of an inner bottle wall 1236. The schedule-display biasing features are evenly spaced around schedule display in increments of 360 degrees divided by the number of indications. Schedule-display biasing features may be in the form of a variety of protrusions or indentations that serve to contact bottle biasing features for the purpose of stopping rotation of the schedule display relative to the bottle. The bottle biasing features including bottle biasing features 1232-1234, may be one or more triangle-shaped extensions, as shown in FIG. 12B, as well as a variety of protrusions or indentations that can complementarily interoperate with the schedule-display biasing features to prevent the schedule display from rotating around the bottle. The CDS implementation shown in FIG. 12B has 7 bottle biasing features. In other CDS implementations, as few as one bottle biasing feature may be used. When more than one bottle biasing features are used, two successive bottle biasing features are spaced in increments that are an integer multiple of the degrees of separation between two successive schedule-display biasing features. The location of the bottle biasing features may also be altered. The bottle biasing features may be located on the inside, outside, top, or bottom of the inner wall of the bottle 1236.

As shown in FIG. 12C, the schedule display 1212 includes a schedule-display ratchet wheel 1240 with 14 ratchet-wheel teeth. When schedule display 1212 is inserted into outer cap 1204, the teeth of ratchet wheels 1220 and 1240 are fully meshed to center the display aperture 1206 over an indication. The cap lugs 1224-1226 snap the schedule display into position and hold the schedule display within the cap. When the cap assembly is placed onto the bottle and rotated clockwise, and as the cap lugs travel along the bottle threading 1242, schedule-display biasing features 1228-1230 collide with bottle biasing features 1232-1234, fixing the position of schedule display with respect to the bottle. As the outer cap continues to rotate around schedule display, the teeth of cap ratchet wheel 1220 slip past the teeth of schedule-display ratchet wheel 1240 in a disengaged direction and display aperture 1206 advances to a next indication. The lower side wall of the schedule display presses into the inner wall of the bottle lip 1236 to form an airtight and water impermeable seal and a cap base 1244 reaches a bottle stop annulus 1246, preventing further rotation.

When the cap assembly is rotated counter-clockwise for removal, the cap ratchet wheel 1220 is interlocked with schedule-display ratchet wheel 1240, fixing the position of the schedule display 1212 with respect to outer cap 1214, so that display aperture 1206 remains centered over an indication.

The number, dimension, and placement of various components of the outer cap 1214, the schedule display 1212, and the bottle 1202 are coordinated to ensure that the device makes precisely one indication in each dispensing cycle of the cap onto the bottle and that each of the relevant components is re-aligned when the device is ready for the next dispensing cycle. The schedule-display biasing features contact the bottle biasing features when the cap has freedom to continue rotating, before the cap is impeded by bottle stop feature 1246. The number of indications is equal to the number of schedule-display biasing features and is an integer multiple of the number of cap lugs so that, in each dispensing cycle, after the outer cap rotates the distance from one indication to the next, the cap lugs are re-aligned with the schedule-display biasing features. The number of schedule-display biasing features is also an integer multiple of the number of bottle biasing features. The ratio of one ratchet tooth to one indication is preserved in the CDS implementation shown in FIGS. 12A-C. However, in other CDS implementations, this ratio may be altered so that the number of teeth is an integer multiple of the number of indicia.

In the CDS implementation shown in FIGS. 12A-C, the cap assembly 1204 with the schedule display 1212 is shown with the bottle 1202 having multiple continuous threads. However, the same cap and schedule display may also work with bottles with a larger or smaller number of threads. For example, when a bottle with three threads is used, the three threads are spaced in integer multiples of the degrees of separation between two successive cap lugs, which are equal to the integer multiples of 360 degrees divided by the number of cap lugs.

Figure 13:
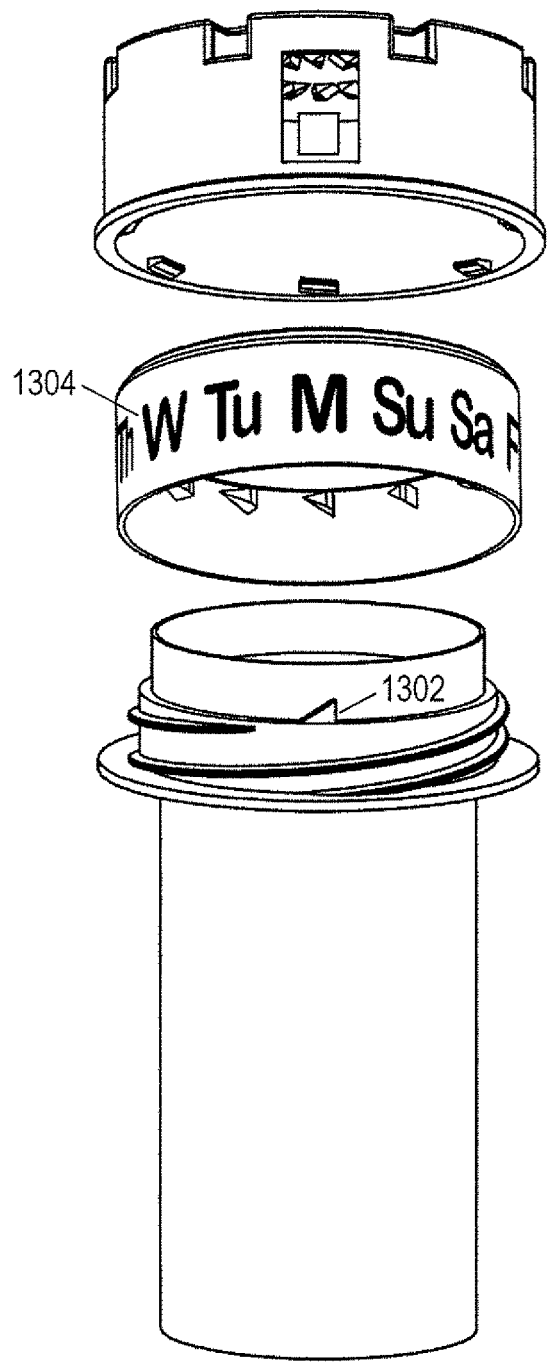
FIG. 13 shows a fourth CDS implementation.

FIG. 13 shows a perspective view of a fourth CDS implementation similar to the implementation shown in FIGS. 12A-C. In the fourth implementation, only a single bottle biasing feature 1302 is used. An alternative implementation uses only one schedule-display biasing feature and uses as many biasing features on the bottle as there are indicia on the schedule display. The schedule display shown in FIG. 12B is designed for a two-a-day dosing schedule, while the schedule display 1304 shown in FIG. 13 is for a one-a-day dosing schedule.

Figure 14:
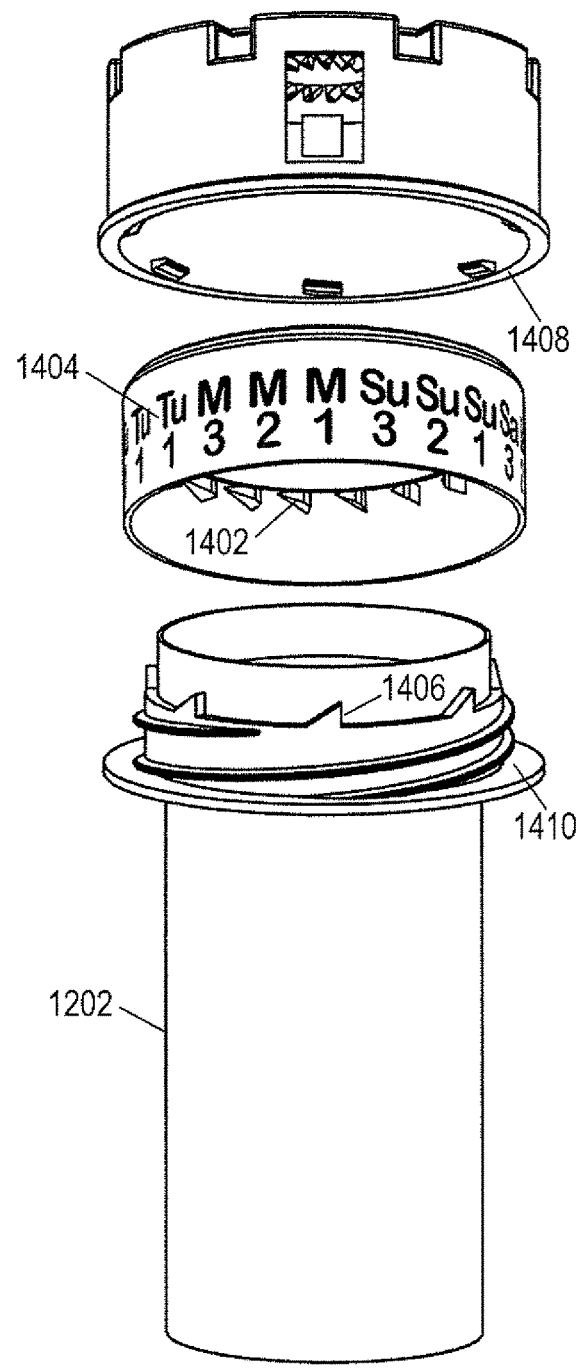
FIG. 14 shows a fifth CDS implementation.

FIG. 14 shows a fifth CDS implementation similar to the implementation shown in FIGS. 12A-C, but with 21 indicia for a 3-a-day dosing schedule. In this fifth implementation, there are 21 schedule-display biasing features, including schedule-display biasing feature 1402, and 21 indications, including indication 1404. The biasing features are positioned higher in the schedule display so that they contact the bottle biasing features, including bottle biasing feature 1406, when there is only $360/21$ degrees of rotation left before cap base 1408 is impeded by bottle stop annulus 1410. The one and two doses-per-day schedules in FIGS. 12A-13 combined with the three doses-per-day schedule demonstrate that a single bottle can be used with caps with all three dosing schedules.

Figure 15A:
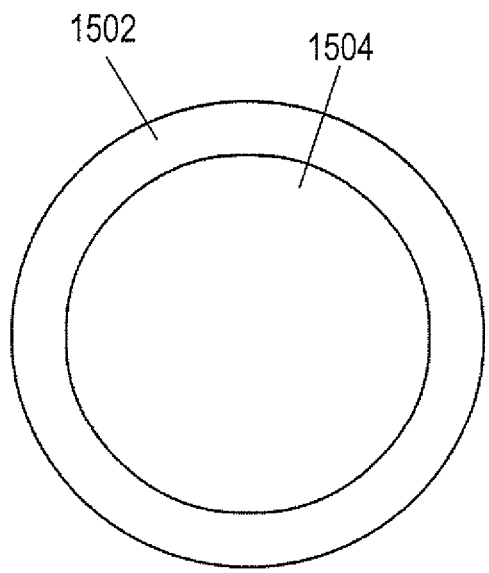
FIGS. 15A-B show a top view of a resealable seal inserted into the cap assembly of the implementation shown in FIG. 1.
Figure 15B:
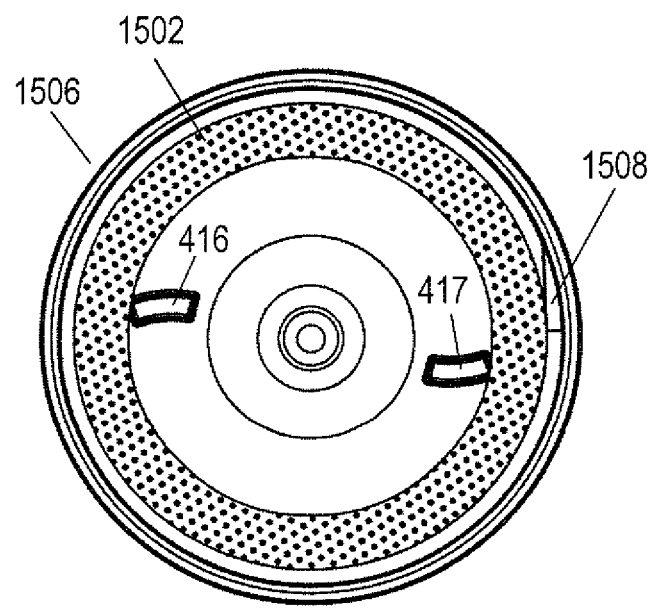

FIGS. 15A-B show a seal 1502 modified with a hole 1504. While the implementations described in this document provide an air and moisture impermeable seal, some manufactures of medications or supplements may prefer the addition of a resealable seal, typically composed of a combination of paper, foil, and wax. Seal 1502 is composed of the same materials as used in commercially available re-sealable seals, but has a hole to enable access to the grips 416-417 discussed above with reference to FIG. 4B. FIG. 15B shows seal 1502 inserted into a cap assembly 1506 held in place under a bottle thread 1508.

CDS implementations function automatically and accurately, preventing human error. CDS implementations are effectively calibrated to any number of schedule elements that are a multiple of seven days of the week and can therefore conform to the most common prescription schedules, although the number of schedule elements may be other than multiples of seven. CDS implementations provide a means for manual adjustment to a correct indication. This is particularly helpful for presetting the indicator to a correct day and time of the first dosage. CDS implementations include a commonly-accepted form of childproofing, are airtight, and do not require a non-standard method of applying the cap to the bottle. CDS implementations function without overly stressing any of the three components, namely the cap, the schedule display, and the bottle, facilitating the reduction and/or elimination of wear. Therefore, CDS implementations achieve a higher level of durability for safe dispensing of medications. The displayed schedule element is not advanced unless the cap is successfully screwed onto a bottle, eliminating potential human error. Furthermore, the displayed schedule element advances one schedule element at a time and, at the end of each dispensing cycle, is automatically realigned for a next cycle.

Each of the components of the example CDS implementation can be rapidly mass-manufactured with simple molds. Each of the example CDS implementations includes only three separate components and can be made of the same materials from which common, commercially-available pill bottles are manufactured. Additionally, the indicating mechanism utilized by the current CDS implementations is designed to function properly despite potential variations in manufacturing accuracy.

The cap assembly of CDS implementations shown in FIGS. 1-11 is compatible with commercially available bottles with standardized neck sizes and finishes. The threaded bottle neck modified to include biasing features of the implementations shown in FIGS. 12A-14 is compatible with both injection and blow molding bottle styles. A standard bottle can be modified to include this feature. Alternatively, the feature may be added via a sleeve that threads onto a currently available bottle or that pops onto the available pop-on neck finish.

Childproofing can be added to CDS implementations in a variety of forms. An outer cap can be added to the cap assembly so that a set of ratchet teeth between the outer cap and the cap assembly engage when rotated in a clockwise direction and release when rotated in a counter-clockwise direction. When the outer cap is mounted to the cap assembly, the ratchet teeth engage to compel the cap assembly to rotate in cooperation with the outer cap. When the cap assembly is rotated counterclockwise for removal, the ratchet teeth of the outer cap rotate relative to the ratchet teeth of the cap assembly and slip over one another unless the outer cap is pushed hard enough into the cap assembly to increase friction between the complementary ratchet teeth overcomes friction in the threads created when the cap is tightened. Alternatively, an extension in the lip of the cap can be provided with hooks that slide over the stop annulus of the bottle when the cap assembly is placed onto the bottle. When an attempt is made to remove the cap, the hooks engage the underside of the stop annulus, preventing the cap from ascending the bottle threads. Squeezing the cap between the hooks temporarily deforms the cap, flattening the portion where squeezed but widening the portion where the hooks reach over the stop annulus so that the hooks release from the bottle and the cap assembly can be removed. Similarly, one or two barbs can be added around the outside of the neck of the bottle and complementary features can be added on the cap, which engage the barbs when the cap is screwed onto the bottle, to prevent counterclockwise rotation. Squeezing the cap between the added features deforms the cap and releases the cap features from the barbs on the bottle. Yet another method is to add a flexible tab to the neck of the bottle with a catch feature and a complementary feature on the cap which engages with the catch feature when the cap is place onto the bottle. To remove the cap, a user depresses the tab, releasing the catch feature. Yet another method is to add a notch to the underside of the bottle threading for the cap thread or lugs to slide once the cap is screwed on, preventing the cap from rotating in the opposite direction for removal. To remove the cap, a user presses the cap down to free the lug or thread from the notch before rotating the cap.

Although the current disclosure has been described in terms of particular CDS implementations, it is not intended that the current disclosure be limited to these CDS implementations. Modifications will be apparent to those skilled in the art. For example, as mentioned above, the number of catch teeth, ramp features, ratcheting features, or biasing features can be varied, in alternative CDS implementations, in order to provide different numbers of schedule elements. In alternative CDS implementations, different biasing mechanisms may be used with same or different shapes or locations. In alternative CDS implementations, an alternative mechanism or feature for rotating the schedule display with respect to the cap in order to set an initial schedule display element may be used instead of the grips discussed above with reference to FIG. 4B. In certain CDS implementations, features complementary to an initial-schedule-element setting tool can be used to ensure that the schedule is set by a pharmacist or other healthcare provider. As discussed above, the schedule elements contain various different types of information related to times, days of the week, dates, and other such characteristics that specify when a next dose is to be administered. The schedule elements may be molded, embossed, printed, or otherwise placed onto the exterior wall of the schedule-display rim. The dimensions and shapes of each of the component features may vary with varying CDS implementations provided that they interoperate together as described above. The cap, schedule display, and bottle may be manufactured from any of many well-known polymeric materials, and can have essentially arbitrary colors, transparencies, rigidity and flexibility, and other such characteristics and parameters. The bottle and cap may contain additional features, including additional information displays, features for facilitating attachment of additional information by pharmacies and pharmacists, and other features.

It is appreciated that the previous description of the disclosed CDS implementations is provided to enable any person skilled in the art to make or use the present disclosure. Various modifications to these CDS implementations will be readily apparent to those skilled in the art, and the generic principles defined herein may be applied to other CDS implementations without departing from the spirit or scope of the disclosure. Thus, the present disclosure is not intended to be limited to the CDS implementations shown herein but is to be accorded the widest scope consistent with the principles and novel features disclosed herein.

The invention claimed is:

1. A container with a dispensing schedule, the container consisting of:
   a conventional bottle with a threaded neck; and
   a cap assembly that includes
      a threaded cap with a display aperture, and
      a schedule display mounted within the threaded cap that includes a circularly ordered set of indications, interoperates with the threaded cap and bottle to advance the display aperture to a next indication of the schedule display when the cap assembly is screwed onto the bottle, and
      interoperates with the threaded cap and bottle to prevent indication advancement when the cap assembly is unscrewed and removed from the bottle;
   wherein the cap, the schedule display, and the bottle are each single-piece components.

2. The container with a dispensing schedule of claim 1 wherein the threaded neck of the bottle has one or more threads. each thread with a thread pitch selected from among:
   a thread pitch of less than 2 degrees:
   a thread pitch of less than 2.5 degrees:
   a thread pitch of less than 5 degrees: and
   a thread pitch of less than 10 degrees.

3. The container with a dispensing schedule of claim 1 wherein the cap includes:
   a cap ratchet wheel:
   cap controlled-slip features; and
   cap catch teeth.

4. The container with a dispensing schedule of claim 3 wherein the schedule display further includes:
   a schedule-display ratchet wheel complementary to the cap ratchet wheel:
   schedule-display controlled-slip features complementary to the cap controlled-slip features; and
   schedule-display catch teeth complementary to the cap catch teeth.

5. The container with a dispensing schedule of claim 4 wherein teeth of the cap ratchet wheel and teeth of the schedule-display ratchet wheel intermesh to lock rotation of the schedule display to that of the cap during an initial portion of a first operation in which the cap is screwed onto the bottle and during a second operation in which the cap is unscrewed from the bottle.

6. The container with a dispensing schedule of claim 4 wherein the teeth of the cap ratchet wheel and the teeth of the schedule-display ratchet slip past one another during an intermediate portion of the second operation in which the cap is screwed onto the bottle to allow for advancement of the display aperture to the next indication of the schedule display.

7. The container with a dispensing schedule of claim 4 wherein the cap controlled-slip features and schedule-display controlled-slip features interoperate to lock rotation of the schedule display to that of the cap during an initial portion of a first operation in which the cap is screwed onto the bottle and then, during the remainder of first operation, release the schedule display to rotate at a slower angular rate than the cap, allowing the cap to descend vertically downward with respect to the schedule display.

8. The container with a dispensing schedule of claim 4 wherein the cap catch teeth and schedule-display catch teeth engage during a latter portion of an operation in which the cap is screwed onto the bottle to lock rotation of the schedule display to that of the cap.

9. A container with a dispensing schedule, the container consisting of:
   a bottle with a threaded neck and one or more bottle biasing features; and
   a cap assembly that includes
      a threaded cap with a display aperture, and
      a schedule display mounted within the threaded cap that includes a circularly ordered set of indications, interoperates with the threaded cap and bottle to advance the display aperture to a next indication of the schedule display when the cap assembly is screwed onto the bottle, and
      interoperates with the threaded cap and bottle to prevent indication advancement when the cap assembly is unscrewed and removed from the bottle.

10. The container with a dispensing schedule of claim 9 wherein the cap, the schedule display, and the bottle are each single-piece components;
    wherein the schedule display includes one or more manual-manipulation features that allow for manual indication advancement; and
    wherein the cap assembly accommodates a seal that, following filling of the container, seals the container.

11. The container with a dispensing schedule of claim 9 wherein, when the cap assembly is screwed onto the bottle, the container with a dispensing schedule produces an audible click as the display aperture is advanced to a next indication of the schedule display schedule display.

12. The container with a dispensing schedule of claim 9 wherein the indication-display aperture is located at position of the cap selected from among a rim of the cap and a top of the cap; wherein the number of indications is equal to 7 multiplied by n, where n is an integer equal to, or greater than, 1; and wherein the bottle includes one of a single thread and multiple threads.

13. The container with a dispensing schedule of claim 1 wherein the cap further includes a cap ratchet wheel;
wherein the schedule display includes
  one or more schedule-display biasing features, and
  a schedule-display ratchet wheel; and
wherein the bottle includes one or more bottle biasing features.

14. The container with a dispensing schedule of claim 13 wherein teeth of the cap ratchet wheel and teeth of the schedule-display ratchet wheel intermesh to lock rotation of the schedule display to that of the cap during an initial portion of a first operation in which the cap is screwed onto the bottle and during a second operation in which the cap is unscrewed from the bottle; and
wherein the one or more schedule-display biasing features interoperate with the one or more bottle biasing features to advance the display aperture to the next indication of the schedule display during a latter portion of the first operation in which the cap is screwed onto the bottle.

* * * * *